US008180827B2

(12) United States Patent
Lim

(10) Patent No.: US 8,180,827 B2
(45) Date of Patent: May 15, 2012

(54) METHOD AND APPARATUS FOR ASSOCIATING GRAPHIC ICON IN INTERNET VIRTUAL WORLD WITH USER'S EXPERIENCE IN REAL WORLD

(75) Inventor: Yong-jun Lim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 177 days.

(21) Appl. No.: 12/249,333

(22) Filed: Oct. 10, 2008

(65) Prior Publication Data

US 2009/0210486 A1 Aug. 20, 2009

(30) Foreign Application Priority Data

Feb. 15, 2008 (KR) .................. 10-2008-0013994

(51) Int. Cl.
*G06F 15/16* (2006.01)
*A63B 67/00* (2006.01)
*G06F 17/00* (2006.01)

(52) U.S. Cl. ............... 709/203; 709/217; 273/440.1; 463/36

(58) Field of Classification Search .............. 709/203, 709/217; 273/440, 440.1; 463/36
See application file for complete search history.

(56) References Cited

U.S. PATENT DOCUMENTS

| 6,545,682 B1 * | 4/2003 | Ventrella et al. ............. 345/473 |
| 6,811,492 B1 * | 11/2004 | Arakawa et al. ............. 463/47 |
| 7,073,129 B1 * | 7/2006 | Robarts et al. ............. 715/740 |
| 7,184,047 B1 * | 2/2007 | Crampton ............. 345/473 |
| 7,737,944 B2 * | 6/2010 | Harrison et al. ............. 345/156 |
| 2004/0193441 A1 * | 9/2004 | Altieri ............. 705/1 |
| 2007/0247979 A1 * | 10/2007 | Brillon et al. ............. 369/30.06 |
| 2008/0059570 A1 * | 3/2008 | Bill ............. 709/203 |
| 2008/0215974 A1 * | 9/2008 | Harrison et al. ............. 715/706 |
| 2008/0267447 A1 * | 10/2008 | Kelusky et al. ............. 382/100 |
| 2008/0284779 A1 * | 11/2008 | Gu et al. ............. 345/419 |
| 2008/0306951 A1 * | 12/2008 | Rodefer ............. 707/9 |
| 2009/0112970 A1 * | 4/2009 | Dawson et al. ............. 709/202 |
| 2009/0157323 A1 * | 6/2009 | Jung et al. ............. 702/19 |
| 2009/0299960 A1 * | 12/2009 | Lineberger ............. 707/3 |

* cited by examiner

*Primary Examiner* — Asghar Bilgrami
(74) *Attorney, Agent, or Firm* — Staas & Halsey LLP

(57) ABSTRACT

A method and apparatus to associate a graphic icon representing a user in an Internet virtual world with the user's experience in the real world, the method including: logging data of an event occurring to the user in the real world; transmitting the logged data to a server; and updating the graphic icon in the virtual world according to the transmitted data. Accordingly, by associating the contents of the user's experience with a database (DB) and expressing the contents in the graphic icon, the user's experiences in the real world can be more realistically expressed in a virtual world.

24 Claims, 4 Drawing Sheets

METHOD AND APPARATUS FOR ASSOCIATING GRAPHIC ICON IN INTERNET VIRTUAL WORLD WITH USER'S EXPERIENCE IN REAL WORLD

CROSS-REFERENCE TO RELATED APPLICATION

This application claims the benefit of Korean Patent Application No. 2008-13994, filed Feb. 15, 2008, in the Korean Intellectual Property Office, the disclosure of which is incorporated herein by reference.

BACKGROUND OF THE INVENTION

1. Field of the Invention

Aspects of the present invention relate to a method and apparatus to associate a graphic icon in an Internet virtual world with a user's experience in the real world, and more particularly, to a method and apparatus to update a graphic icon representing a user in the Internet by reflecting information regarding the user's experience in the real world in the graphic icon.

2. Description of the Related Art

Nowadays, the Internet has become an important part of everyday life. In particular, expressing oneself through a mini-homepage, a blog, and/or a private messenger has become very popular. Furthermore, with the advent of virtual worlds (such as Second Life), characters expressing users in the Internet have become commonplace.

An avatar (i.e., a graphic icon expressing oneself in a virtual world) refers to one's other self or an incarnation and is a compound word of Sanskrit Ava, meaning "coming down," and Terr, meaning "the earth." In ancient India, an avatar denoted the incarnation of God who had come down to Earth. However, in the Internet era, an avatar denotes an animation character or a graphic icon representing a user in a virtual world, such as a cyberspace. Moreover, the term avatar may refer more widely as an online identity. At present, avatars are widely used in online chatting services (such as icon chatting and three-dimensional (3D) graphic chatting), and various other genres (such as online games, cyber shopping malls, virtual education, virtual offices, and animation). Users may have a human relationship through avatars, enjoy chatting, play games, exchange information, and learn again how to see, read, speak, and behave.

Thus, an avatar may be a virtual body representing oneself in a graphic-based virtual world. Most conventional avatars are 2-dimensional (2D) images. Avatars in mud games or online chatting forums are relatively basic. Recently, however, realistic 3-dimensional (3D) avatars with 3D effects are being used. An avatar connects the real world to cyberspace and can be anonymous or represent a real person. While Internet users in the past were fascinated by the anonymity of cyberspace, Internet users nowadays want to express themselves and use avatars to satisfy both of these desires.

Most games and chatting services combine several characters or provide ready-made avatars. However, graphic technology has developed to the point where exclusive avatars with personalities generated by users (such as character identifications (IDs)) have been used by replacing ready-made avatars generated by service providers.

FIG. 1 is a block diagram of a conventional user-based avatar generation system. Referring to FIG. 1, the conventional user-based avatar generation system includes a 3D scanner 100, an avatar generation module 110, a fitting module 120, a transmission module 130, an avatar database (DB) 140, an item DB 150, and a body DB 160.

The 3D scanner 100, which is driven by a user or an arbitrary manager, performs 3D scanning of the user, generates 3D pattern data, and transmits the 3D pattern data to the avatar generation module 110. In this case, the user can scan a face and/or whole body of the user by using the 3D scanner 100. The 3D scanner 100 generates 3D facial pattern data corresponding to the face of the user and/or 3D body pattern data corresponding to the whole body of the user.

The avatar generation module 110, which includes a graphic tool, generates a 3D avatar image of the user by using the 3D pattern data generated by the 3D scanner 100 and stores the generated 3D avatar image in the avatar DB 140. When the avatar generation module 110 receives the 3D facial pattern data from the 3D scanner 100, the avatar generation module 110 generates a 3D facial image and generates a 3D avatar image by reading bodies stored in the body DB 160, displaying the read bodies on a predetermined display device, and combining the 3D facial image and a body selected by the user from the displayed bodies.

The fitting module 120, which is driven according to a fitting request of the user, displays various items (e.g., dresses and accessories) stored in the item DB 150 on the display device by reading the various items from the item DB 150. Furthermore, the fitting module 120 displays the 3D avatar image on a display device by adding items selected by the user onto the 3D avatar image.

The transmission module 130 receives information on a terminal, input by the user, to which the 3D avatar image is transmitted, and provides the 3D avatar image fitted according to the fitting request of the user or the 3D avatar image generated by the avatar generation module 110 to the terminal. In this case, the information on the terminal to which the 3D avatar image is transmitted may be information (e.g., an Internet protocol (IP) address, e-mail, etc.) on a mobile terminal or wired terminal of the user. If the information on the terminal to which the 3D avatar image is transmitted is information on a mobile terminal of the user, the transmission module 130 transforms and transmits the 3D avatar image to be transmitted to the mobile terminal of the user in a multimedia messaging service (MMS) pattern.

However, this conventional user-based avatar generation system has the inconvenience that a user must determine every feature of the avatar on a personal computer (PC). That is, information on the user cannot be reflected on the avatar in an offline mode. Thus, an avatar cannot fully express information on the user 24 hours a day. Recently, a method of directly accessing the Internet through a mobile device and updating the contents of an avatar has been studied. However, this method is not different from the prior art in that a mobile device is just used instead of a PC.

SUMMARY OF THE INVENTION

Aspects of the present invention provide a method and apparatus to update a graphic icon by logging information on a user's experiences, transmitting the logged information to a server, and expressing a current state of the user in a service of a virtual world when the graphic icon expressing the user is expressed in the Internet.

According to an aspect of the present invention, there is provided a method of associating a graphic icon in a virtual world with a user's experience in a real world, the method including: logging data of an event occurring to the user in the real world; transmitting the logged data to a server; and updating the graphic icon in the virtual world based on the transmitted data.

The logging may include detecting the event according to an external signal or in real-time.

The logging may further include: storing at least one piece of data corresponding to the detected event; and determining a predetermined number of pieces of data representing the event from among the at least one piece of stored data.

The transmitting may including transmitting the data to the server according to an external signal or in real-time.

The transmitting may further include transmitting the data via an interactive service using an application program interface (API) operation.

The transmitting may further include: receiving information included in the graphic icon; comparing the received information to the logged data of the event of the user to determine data added to or changed from the graphic icon; and transmitting the data added to or changed from the graphic icon according to the comparison result.

The updating may include: classifying a category of the transmitted data; and searching for a value matching the classified data from a database (DB) included in the server.

The updating may further include, if there is no value matching the classified data in the DB based on the search result, generating an object of the classified data.

The updating may further include billing the user according to the search result.

According to another aspect of the present invention, there is provided an apparatus to associate a graphic icon in a virtual world with a user's experience in a real world, the apparatus including: an event logging unit to log data of an event occurring to the user in the real world; a transmitter to transmit the logged data to a server; and an updating unit to update the graphic icon in the virtual world based on the transmitted data.

The event logging unit may include an event detector to detect the event according to an external signal or in real-time.

The event logging unit may further include: a storage unit to store at least one piece of data corresponding to the detected event; and an event determiner to determine a predetermined number of pieces of data representing the event from among the at least one piece of stored data.

The transmitter may transmit the data to the server according to an external signal or in real-time.

The transmitter may include an interface unit to transmit the data via an interactive service using an application program interface (API) operation.

The interface unit may include: a receiver to receive information included in the graphic icon; and a comparator to compare the received information to the logged data of the event of the user, and the interface unit may transmit data added to or changed from the graphic icon according to the comparison result.

The updating unit may include: a classifier to classify a category of the transmitted data; and a search unit to search for a value matching the classified data from a database (DB) included in the server.

The updating unit may further include an object generator to generate an object of the classified data if there is no value matching the classified data in the DB based on the search result.

The updating unit may further include a billing unit to bill the user according to the search result.

According to another aspect of the present invention, there is provided a computer readable recording medium storing a computer readable program to execute the method.

According to yet another aspect of the present invention, there is provided a method of associating a graphic icon in a virtual world with a user's experience in a real world, the method including: logging data of an event occurring to the user in the real world; and transmitting the logged data to a server in order to update the graphic icon in the virtual world.

According to still another aspect of the present invention, there is provided a method of associating a graphic icon in a virtual world with a user's experience in a real world, the method including: receiving logged data of an event occurring to the user in the real world; and updating the graphic icon in the virtual world based on the received data.

According to another aspect of the present invention, there is provided an apparatus to associate a graphic icon in a virtual world with a user's experience in a real world, the apparatus including: an event logging unit to log data of an event occurring to the user in the real world; and a transmitter to transmit the logged data to a server in order to update the graphic icon in the virtual world.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
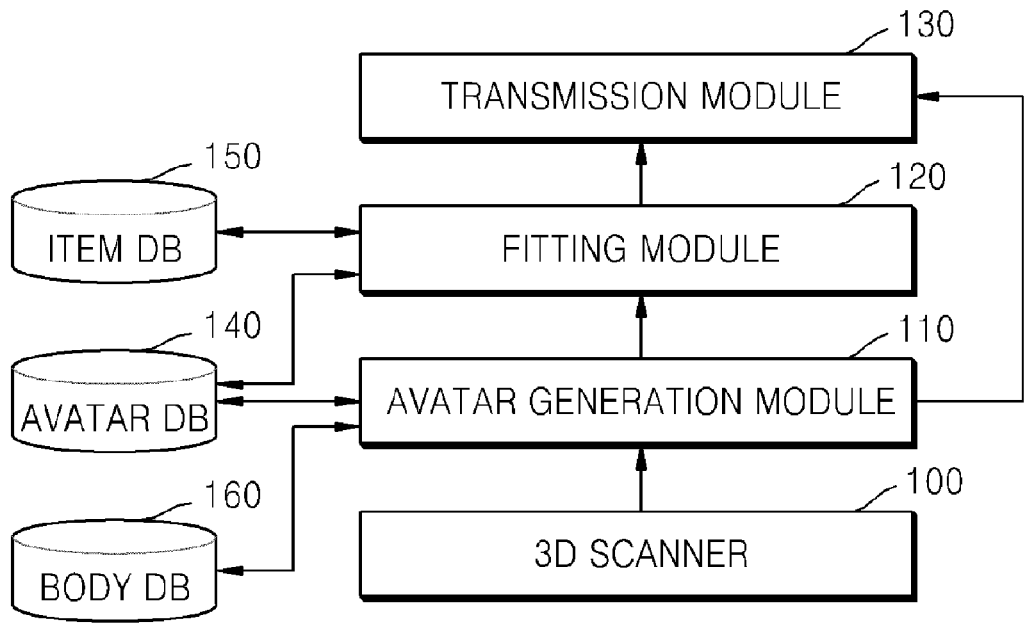
FIG. 1 is a block diagram of a conventional user-based avatar generation system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
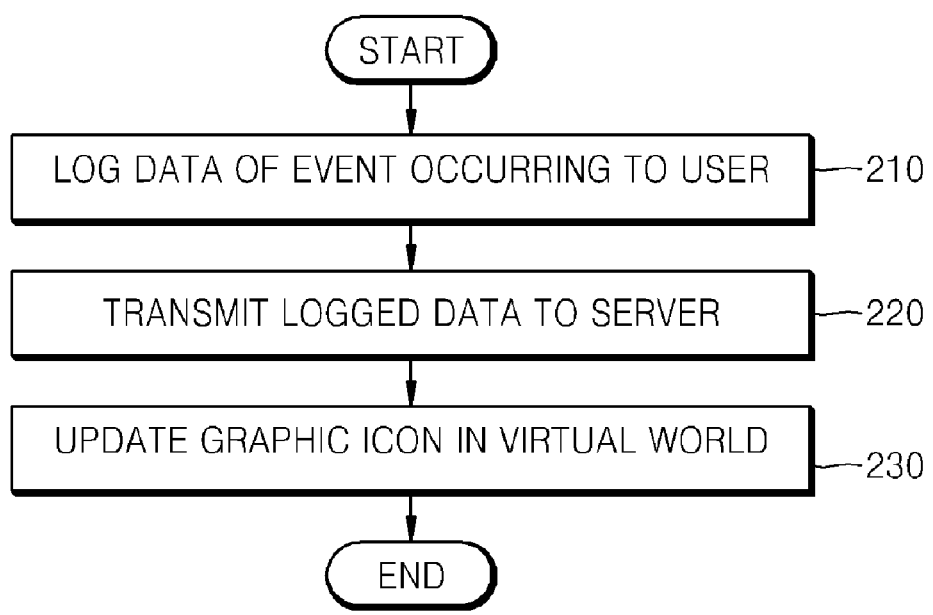
FIG. 2 is a flowchart illustrating a method of associating a graphic icon representing a user in an Internet virtual world with the user's experience in the real world, according to an embodiment of the present invention.

FIG. 2 is a flowchart illustrating a method of associating a graphic icon representing a user in an Internet virtual world with the user's experience in the real world, according to an embodiment of the present invention. Referring to FIG. 2, data of an event occurring to the user is logged in operation 210. Then, the logged data is transmitted to a server in operation 220, and the graphic icon is updated in the Internet virtual world based on the transmitted data in operation 230.

Specifically, in operation 210, data of an event occurring to the user in the real world is logged. That is, information regarding various activities of the user in a general life is logged. For example, when the user performs an activity (such as shopping or watching a movie), the user can directly log data by writing a memo or taking a picture about the activity using a device having a data logging operation. This case is referred to as active logging. Data logging may be performed manually, as described above, or by a sensor or an automatic device even in a state in which the user is unaware. This latter case is referred to as passive logging. The event occurring to the user can include any type of information on a user's experiences in the real world. For example, the event occurring to the user can be an environmental change (such as moving to another place or traveling), an activity change (such as doing exercise or homework), or an item change (such as changing a hairstyle or wearing glasses).

In operation 220, the logged data is transmitted to the server. That is, in order for a graphic icon (hereinafter, avatar) expressing a user in a virtual world (such as Second Life) to be expressed as a figure and behavior of the user in the real world, data of an event (a place change, a motion change, an item change, etc.) occurring to the user in the real world is transmitted to the server. In this case, the user can directly transmit the data through a key input or automatically transmit the data through a service device. Alternatively, according to other aspects, an interactive service using an application program interface (API) operation can be used, which will be described in detail with reference to FIG. 3.

In operation 230, the avatar is updated according to the transmitted data. If there is the same data stored in a DB included in the server as the transmitted data, then the matched data is read from the DB and applied to the avatar. For example, a search is performed on the DB of the server by using a value of the transmitted data as an index, and display of the avatar can be performed by mapping the matched graphic data value to a specific scene including the avatar. However, if there is no value in the DB matching the transmitted data, a new graphic data value is generated, and the DB is extended by adding the generated graphic data value to the DB.

According to the realization of a ubiquitous network concept and the development of Web 2.0 having a concept of participation and sharing, it is expected that a cyber world (such as blogs and social network services (SNS)) will be more popularized and developed. Thus, the real world and the cyber world will become more interconnected and identification of the real world and the cyber world will become ambiguous. Conventionally, a user's current experiences (e.g., buying a new handbag) are not reflected on an avatar (i.e., an experience in the real world is not linked to a virtual world), and the real world and the virtual world do not interwork. However, according to aspects of the present invention, an avatar more accurately reflecting a user's experience in the real world is provided, the user's experiences are realistically expressed in a virtual world, and a service of conveniently managing a cyberspace (such as a blog or a mini-homepage) is provided to express the contents of the user's experience on a real-time basis.

Figure 3:
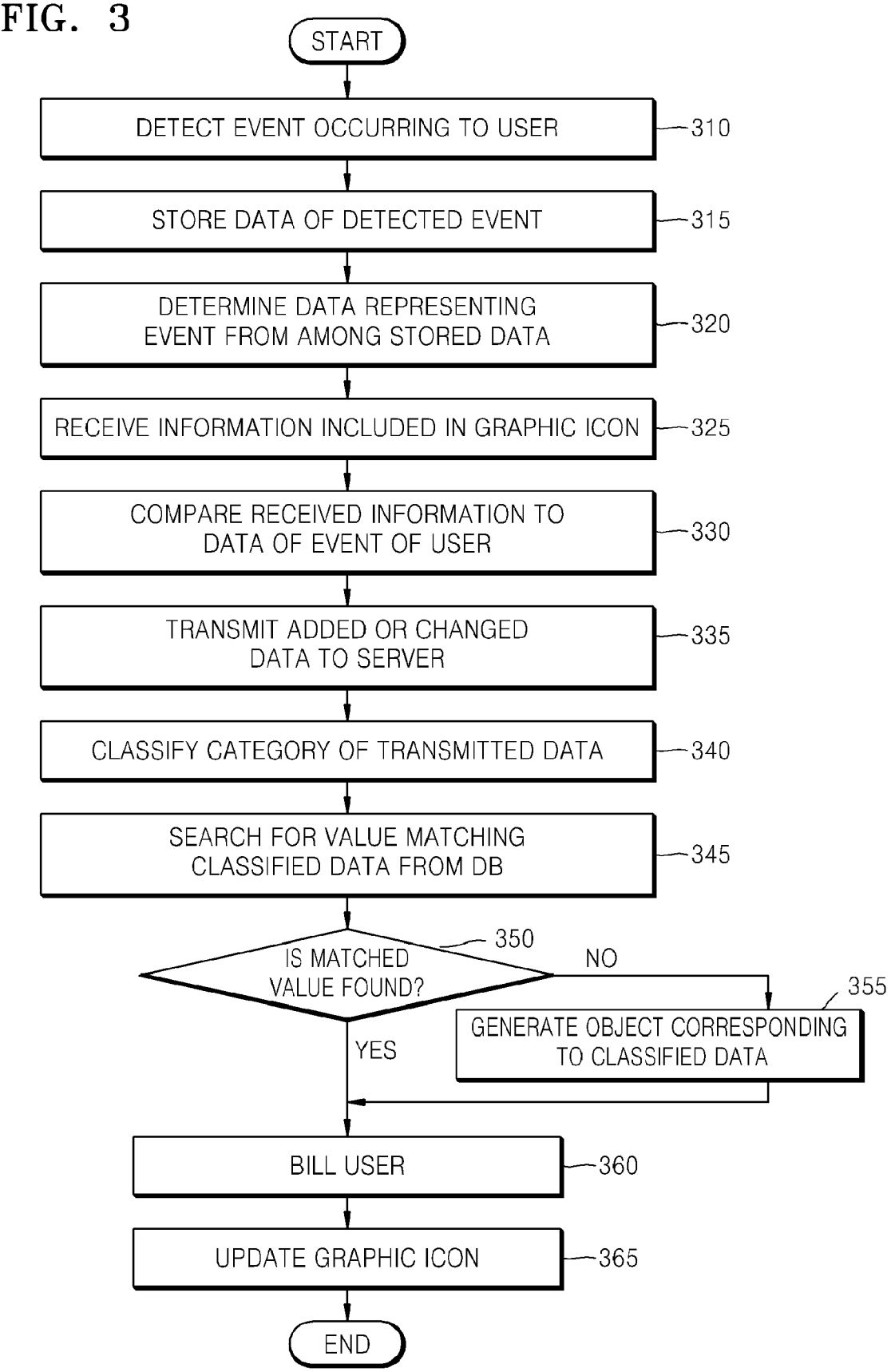
FIG. 3 is a flowchart illustrating a method of associating a graphic icon representing a user in an Internet virtual world with the user's experience in the real world, according to another embodiment of the present invention.

FIG. 3 is a flowchart illustrating a method of associating a graphic icon representing a user in an Internet virtual world with the user's experience in the real world, according to another embodiment of the present invention. Referring to FIG. 3, an event occurring to the user is detected in operation 310. Then, data with respect to the detected event is stored in operation 315, and data representing the event from among the stored data is determined in operation 320. Information included in the graphic icon (such as an avatar) is received in operation 325, and compared to the data of the event of the user in operation 330. Data added or changed according to the comparison result is transmitted in operation 335, and a category of the transmitted data is classified in operation 340. A value matching the classified data is searched in a database (DB) in operation 345. Whether the matched value exists in the database is determined in operation 350, and a new object is generated if the matched value does not exist in operation 355. The user is billed in operation 360 and the avatar is updated in the virtual world in operation 365.

Comparing the embodiment illustrated in FIG. 3 to the embodiment illustrated in FIG. 2, the logging of data of an event occurring to the user (operation 210) includes: detecting an event occurring to the user (operation 310), storing data with respect to the detected event (operation 315); and determining data representing the event from among the stored data (operation 320). In the detecting of an event occurring to the user (operation 310), the event may be detected via an external signal (such as a key input of the user) or in real-time. In this case, a specific device (such as a mobile blog (MB) caster) may be used, wherein the MB caster can synthetically compile and store data of the detected event (dress shopping, hairstyle changing, nail painting, exercising, etc.) and determine one or more essential pieces of data that represents the event by excluding duplicated data or minor data from among the compiled and stored data.

In operation 220, the data of the event occurring to the user is transmitted to the server. In detail, this transmission may be performed via an external signal (such as a key input of the user) or in real-time, or the data may be interactively transmitted by using an API operation. For example, current information included in the avatar is requested and received by using getRecentPosts( ) in operation 325, and the received information on the avatar is compared to the data of the event of the user in operation 330. The information on the avatar can be configured in a tree pattern, and the event occurring to the user can be compared to the current configuration (denoting each node of the tree) of the avatar. According to the comparison, if the event occurring to the user corresponds to a new configuration that does not exist in the avatar, added or changed data is transmitted to the server by using editPost( ) in operation 335.

The transmitted data is classified into one of a plurality of categories in operation 340, and a search is performed in order to determine whether a value matching the classified data exists in the DB in operation 345. According to the search, it is determined in operation 350 whether a value matching the classified data exists in the DB. If the same data is found in the DB, the matched data is read from the DB and applied to the avatar in operation 365. That is, a search is performed by using a value of the transmitted data as an index, and an updated avatar can be expressed by mapping a matched graphic data value to a specific scene including the avatar. However, if the same data is not found in the DB (i.e., if the transmitted data is new data), a new object is generated in operation 355. In the process of reflecting the user's experience in the real world on the avatar, a commission can be billed to the user in operation 360 (for example, via a mixed_reality broker). When the commission is billed, more money may be requested in the case where the DB is updated by generating an object corresponding to a new experience.

As described above, the method according to the current embodiment of the present invention can more closely connect the real world with a virtual world using a network by linking the contents of a user's current experience with a DB of a server without a specific action and expressing the contents in an avatar.

Figure 4:
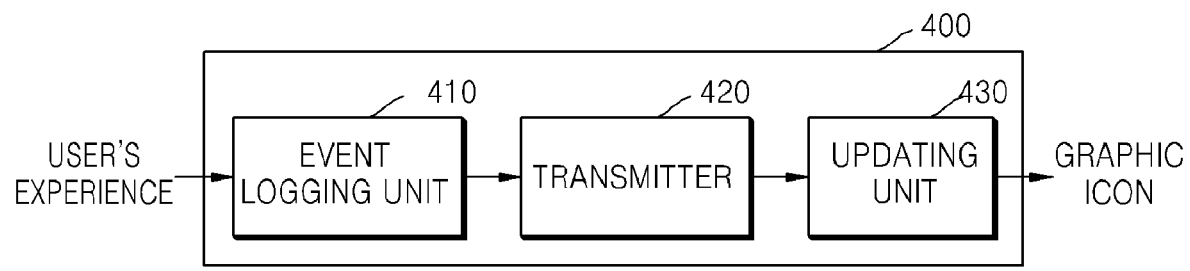
FIG. 4 is a block diagram of an apparatus to associate a graphic icon representing a user in an Internet virtual world with the user's experience in the real world, according to an embodiment of the present invention.

FIG. 4 is a block diagram of an apparatus 400 to associate a graphic icon in an Internet virtual world with a user's experience in the real world, according to an embodiment of the present invention. Referring to FIG. 4, the apparatus 400 includes an event logging unit 410 to log data of an event occurring to the user, a transmitter 420 to transmit the logged data to a server, and an updating unit 430 to update the graphic icon in the Internet virtual world based on the transmitted data.

The event logging unit 410 logs data of an event occurring to the user in the real world. That is, the event logging unit 410 logs various kinds of information acquired by the user in everyday life. For example, when the user performs activities (such as traveling and watching movies), the user can log data by directly writing a memo or taking a picture about the activities (referred to as active logging) or through various sensors even in a state in which the user is unaware (referred to as passive logging).

The transmitter 420 transmits the logged data to the server. That is, in order for a graphic icon (such as an avatar) expressing a user in a virtual world (such as a mini-homepage or a blog) to be expressed as a figure and behavior of the user in the real world, the transmitter 420 transmits data of an event occurring to the user to the server. In this case, the data can be directly transmitted through a key input of the user or automatically transmitted through a service device. Alternatively, the data can be interactively transmitted by using an API operation.

The updating unit 430 updates the avatar according to the transmitted data. If the transmitted data is the same as data stored in a DB included in the server, the matched data is read from the DB and applied to the avatar to update the avatar. For example, a search is performed on the DB of the server by using a value of the transmitted data as an index, and display of the avatar can be performed by mapping the transmitted data value to a graphic data value matched to a specific scene including the avatar. However, if there is no value matching the transmitted data as a result of the DB search, a new graphic data value is generated, and the DB is extended by adding the generated graphic data value to the DB.

Figure 5:
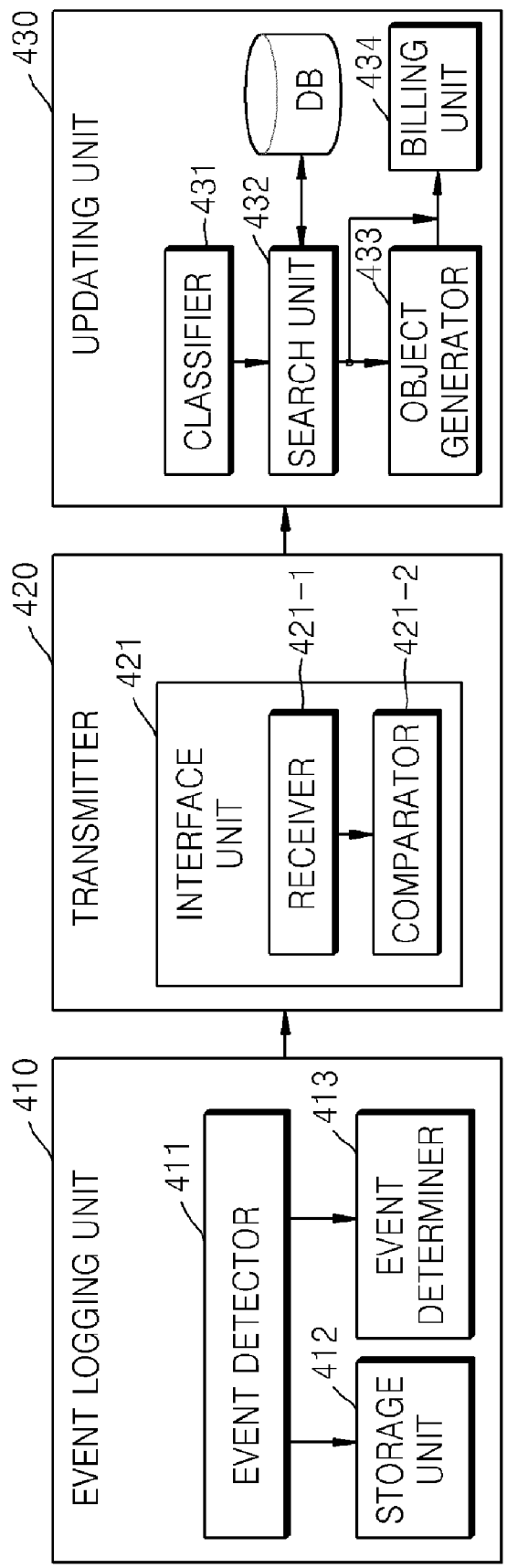
FIG. 5 is a detailed block diagram of an apparatus to associate a graphic icon in an Internet virtual world with a user's experience in the real world, according to another embodiment of the present invention.

FIG. 5 is a detailed block diagram of an apparatus to associate a graphic icon in an Internet virtual world with a user's experience in the real world, according to another embodiment of the present invention. Referring to FIG. 5, the event logging unit 410 includes an event detector 411, a storage unit 412 and an event determiner 413. The event detector 411 detects an event occurring to the user via an external signal or in real-time. The storage unit 412 stores at least one piece of data of the detected event, and the event determiner 413 determines data representing the event from among the at least one piece of stored data.

The transmitter 420 includes an interface unit 421 that includes a receiver 421-1 and a comparator 421-2. The interface unit 421 transmits the data of the event logging unit 410 via an interactive service using an API operation. This is referred to as an embedded blog auto-sync agent. The receiver 421-1 receives information included in the graphic icon (such as an avatar), and the comparator 421-2 compares the received information to the logged data of the event of the user. The interface unit 421 transmits data added to or changed from the avatar according to the comparison result.

The updating unit 430 includes a classifier 431, a search unit 432, an object generator 433 and a billing unit 434. The classifier 431 classifies a category of the transmitted data, and the search unit 432 searches for a value matching the classified data in a DB included in the server. The object generator 433 generates a new object of the classified data if there is no value matching the classified data in the DB according to the search result. The billing unit 434 bills the user according to the search result of the search unit 432.

According to aspects of the present invention, more information of the real world can be reflected in virtual worlds. That is, aspects of the present invention more closely connect the real world with a virtual world using a network by transforming the contents of a user's experience to information (such as text, sound, photographs, images, etc.), linking the information to a DB of a server, and expressing the information in an avatar to more realistically express the user's experience in the virtual world.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. Aspects of the present invention may also be realized as a data signal embodied in a carrier wave and comprising a program readable by a computer and transmittable over the Internet.

According to aspects of the present invention, by implementing mixed reality by linking an Internet virtual world to current information experienced and felt by a user in a situation where an avatar expresses the user in the Internet virtual world, the user's experience can be easily expressed in cyberspaces (such as mini-homepages and blogs). In addition, the concept of a mixed reality broker suggested in aspects of the present invention creates a new opportunity in a mixed reality service.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of associating a graphic icon in a virtual world with a user's experience in a real world, the method comprising:

storing correspondence information in a database, the correspondence information associating graphic data values of one or more events that have previously occurred to the user in the real world with an action of the graphic icon;

logging data of an event currently occurring to the user in the real world;

assigning a graphic data value representing the event currently occurring to the user based on the logged data;

transmitting the graphic data value to the database;

comparing the graphic data value representing the event currently occurring to the user with the correspondence information;

when the comparison indicates that the event currently occurring to the user is the same as one of the one or more of the events that have previously occurred to the user, updating the graphic icon in the virtual world based on the correspondence information; and when the comparison indicates that the event currently occurring to the user is not the same as one of the one or more of the events that have previously occurred to the user, generating a new graphic icon representing the event currently occurring to the user, displaying the new graphic icon, and updating the correspondence information.

2. The method as claimed in claim 1, wherein the logging of the data of the event comprises detecting the event according to an external signal or in real-time.

3. The method as claimed in claim 2, wherein the logging of the data of the event further comprises:
storing at least one piece of data corresponding to the detected event; and
determining a predetermined number of pieces of data representing the event from among the stored at least one piece of data.

4. The method as claimed in claim 1, wherein the transmitting comprises transmitting the data to the server according to an external signal or in real-time.

5. The method as claimed in claim 1, wherein the transmitting comprises transmitting the data via an interactive service using an application program interface (API) operation.

6. The method as claimed in claim 1, wherein the updating of the graphic icon comprises:
classifying a category of the transmitted data; and
searching for a value matching the classified data from the database (DB), DB being included in the server.

7. The method as claimed in claim 6, wherein the updating of the graphic icon further comprises, if there is no value matching the classified data in the DB according to a result of the searching, generating an object of the classified data for the DB.

8. The method as claimed in claim 7, wherein the updating of the graphic icon further comprises billing the user according to the result of the searching.

9. The method as claimed in claim 1, wherein the graphic icon is an avatar.

10. The method as claimed in claim 1, wherein the logging of the data of the event comprises automatically detecting the event by a sensor and/or an automatic device.

11. The method as claimed in claim 1, wherein the virtual world is an Internet virtual world.

12. The method as claimed in claim 1, wherein the logging of the data of the event comprises logging the data of the event while the user is in an off-line mode.

13. An apparatus to associate a graphic icon in a virtual world with a user's experience in a real world, the apparatus comprising:
a database storing correspondence information, the correspondence information associating graphic data values of one or more events that have previously occurred to the user in the real world with an action of the graphic icon;
an event logging unit to log data of an event currently occurring to the user in the real world;
a processor to assign a graphic data value to the user representing the event currently occurring to the user based on the logged data;
a transmitter to transmit the graphic data value to the database;
a comparator to compare the graphic data value representing the event currently occurring to the user with the correspondence information; and
an updating unit to update the graphic icon in the virtual world based on the correspondence information when the comparison indicates that the event currently occurring to the user is the same as one of the one or more of the events that have previously occurred to the user, and to generate a new graphic icon representing the event currently occurring to the user, display the new graphic icon, and update the correspondence information when the comparison indicates that the event currently occurring to the user is not the same as one of the one or more of the events that have previously occurred to the user.

14. The apparatus as claimed in claim 13, wherein the event logging unit comprises an event detector to detect the event according to an external signal or in real-time.

15. The apparatus as claimed in claim 14, wherein the event logging unit further comprises:
a storage unit to store at least one piece of data corresponding to the detected event; and
an event determiner to determine a predetermined number of pieces of data representing the event from among the stored at least one piece of data.

16. The apparatus as claimed in claim 13, wherein the transmitter transmits the data to the server according to an external signal or in real-time.

17. The apparatus as claimed in claim 13, wherein the transmitter comprises an interface unit to transmit the data via an interactive service using an application program interface (API) operation.

18. The apparatus as claimed in claim 13, wherein the updating unit comprises:
a classifier to classify a category of the transmitted data; and
a search unit to search for a value matching the classified data from the database (DB), the database being included in the server.

19. The apparatus as claimed in claim 18, wherein the updating unit further comprises an object generator to generate an object of the classified data if there is no value matching the classified data in the DB according to the search result.

20. The apparatus as claimed in claim 19, wherein the updating unit further comprises a billing unit to bill the user according to the search result.

21. The apparatus as claimed in claim 13, wherein the graphic icon is an avatar.

22. The apparatus as claimed in claim 13, wherein the event logging unit comprises an event detector to automatically detect the event.

23. The apparatus as claimed in claim 13, wherein the virtual world is an Internet virtual world.

24. The apparatus as claimed in claim 13, wherein the event logging unit logs the data of the event occurring to the user while the apparatus is in an off-line mode.

* * * * *